June 14, 1960  O. A. BROWN ET AL  2,940,523
SELF-FEEDING CASING MILL
Filed April 1, 1957  3 Sheets-Sheet 1

ORA A. BROWN,
GLENN D. JOHNSON,
INVENTOR.

BY
ATTORNEYS.

June 14, 1960 O. A. BROWN ET AL 2,940,523
SELF-FEEDING CASING MILL
Filed April 1, 1957 3 Sheets-Sheet 2
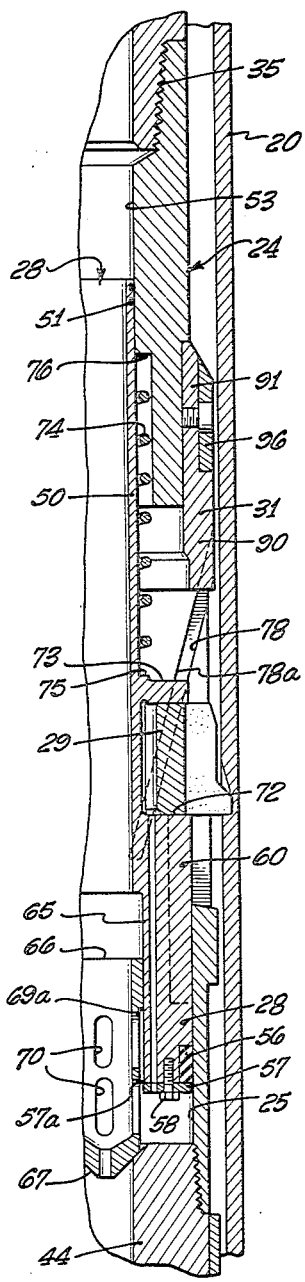
FIG. 5.
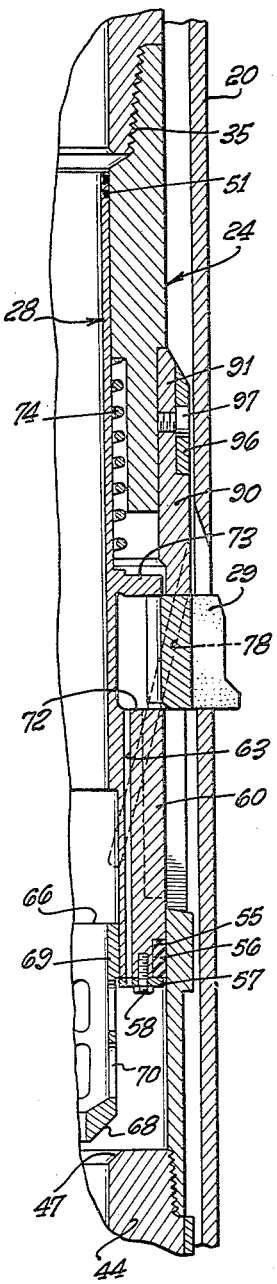
FIG. 6.
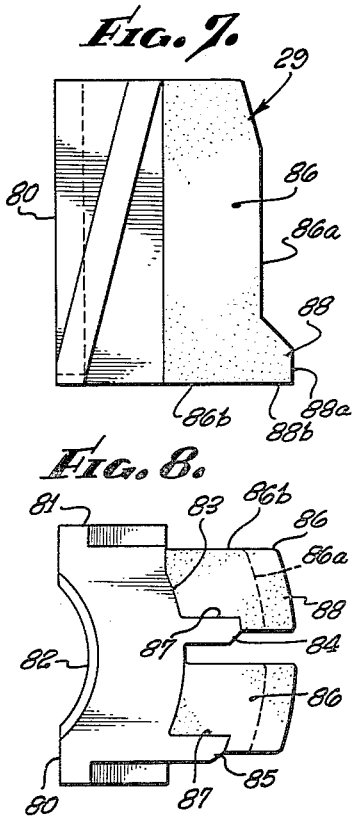
FIG. 7.
FIG. 8.
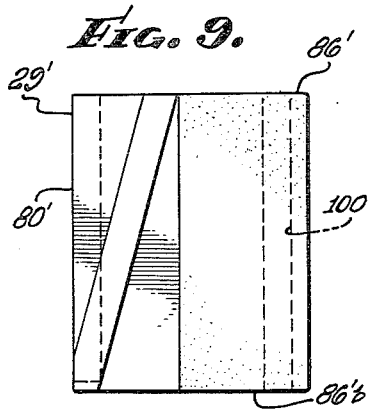
FIG. 9.
ORA A. BROWN
GLENN D. JOHNSON
INVENTOR.
BY
ATTORNEYS.

June 14, 1960  O. A. BROWN ET AL  2,940,523
SELF-FEEDING CASING MILL
Filed April 1, 1957  3 Sheets-Sheet 3

ORA A. BROWN
GLENN D. JOHNSON
INVENTOR.

BY
ATTORNEYS.

United States Patent Office 2,940,523
Patented June 14, 1960

---

2,940,523

SELF-FEEDING CASING MILL

Ora A. Brown, Whittier, Calif., and Glenn D. Johnson, Houston, Tex., assignors to Joy Manufacturing Company, Pittsburgh, Pa., a corporation of Pennsylvania Filed Apr. 1, 1957, Ser. No. 649,706

17 Claims. (Cl. 166—55.8)

This invention relates to a casing mill and more particularly to a means for internally cutting through the wall of a pipe casing in a well.

It is desirable for various purposes to cut through a casing in a well to provide an opening or window therein at a selected distance below ground surface. Prior proposed devices and means for cutting such a window in a well casing have included rotatable cutting knives carried by a cutting device rotated by a drilling or pipe string, said knives being pivotally mounted to swing radially outwardly to engage the casing wall. Such prior proposed internal cutting means for a casing wall have included several disadvantages such as rapid wear of the knives, frequent breakage, rapid wear of the pivotal mounting of the knives, and a limited number of cutting edges for engagement with the casing wall.

The present invention contemplates a cutting device or a casing mill which obviates the disadvantages of the prior proposed cutting devices having pivotally mounted cutting knives or blades. In the present invention, rotatable cutter members are not pivotally mounted; instead they are so arranged that during initial cutting each of a plurality of cutter members is self-feeding or self-energizing, that is, once the cutter means begin to cut or bite into the internal surface of a casing wall, downward pressure applied through the drilling string and imposed during cutting urges the members outwardly during rotation along a predetermined path against the casing wall. Moreover, each cutter member of the present invention is so designed that more cutting edges are provided and each cutter member includes means to facilitate removal or flushing of cuttings.

An object of this invention is to design and provide a novel cutting device or casing mill for internally cutting a casing wall in a well in a rapid manner.

An object of this invention is to disclose and provide a cutting device or casing mill for a pipe casing wherein cutter members are uniformly guided and urged radially outwardly into contact with the internal surface of the casing wall.

Another object of this invention is to disclose and provide a casing mill in which cutter members are so mounted that as downward pressure is applied to the casing mill, the cutter members are self-energized to be urged outwardly into cutting contact with the internal surface of the casing mill.

A still further object of this invention is to disclose and provide a casing mill in which cutter members are carried by a piston which is operable in a piston chamber carried by a casing mill body member which provides guide means for said cutting members, said piston being responsive to pressure of drilling fluid to initially urge said cutter members into cutting engagement with a casing wall.

A still further object of this invention is to disclose and provide a casing mill including a plurality of cutter members of novel design and shape.

A more specific object of this invention is to disclose and provide a novel arrangement of a casing mill body member, a piston means operable therein, and cutter members carried by the piston means and slidably engaged with body member and movable through longitudinal openings in the body member to cut into the wall of a casing.

Other objects and advantages of this invention will be readily apparent from the following description of the drawings in which an exemplary embodiment of this invention is shown.

In the drawings:

Fig. 5 is a fragmentary sectional view taken in the same plane as Fig. 1 and showing the casing mill after the internal surface of a casing wall has been partially cut.

Fig. 6 is a fragmentary sectional view taken in the same plane as Fig. 5 showing the casing mill with the cutting members in extended outer position after having cut entirely through the casing wall and in position to cut a section or length out of the casing wall.

Fig. 7 is a side view of a first cutter member employed with the casing mill of this invention.

Fig. 8 is a bottom view of the cutter member shown in Fig. 7.

Fig. 9 is a side view of a second cutter member of different construction than that shown in Fig. 7.

Figure 1:
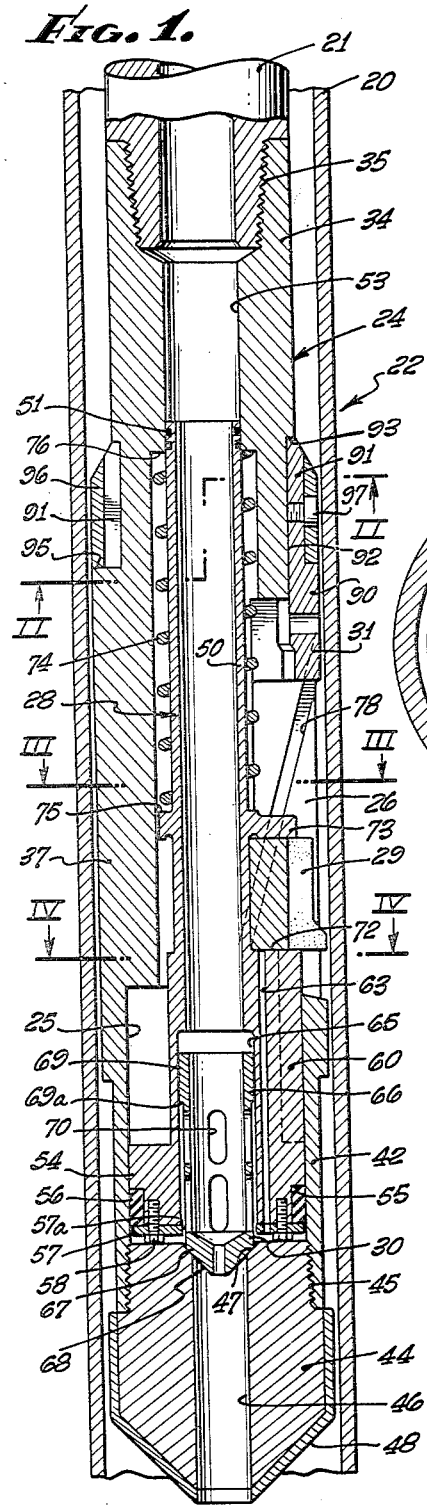
Fig. 1 is a fragmentary sectional view of a casing mill embodying this invention, the section being taken in a diametrical plane bisecting the casing mill and a well casing, the casing mill being shown in initial retracted position.
Figure 2:
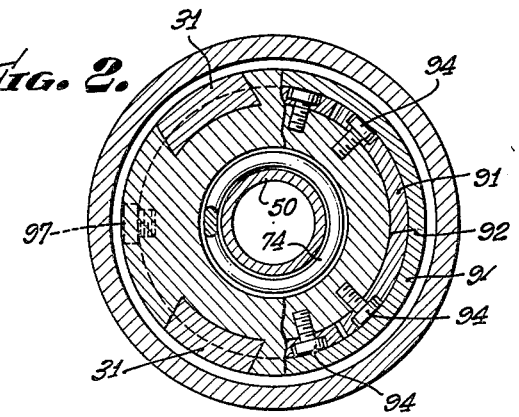
Fig. 2 is a transverse sectional view taken in the planes indicated by line II—II of Fig. 1.
Figure 3:
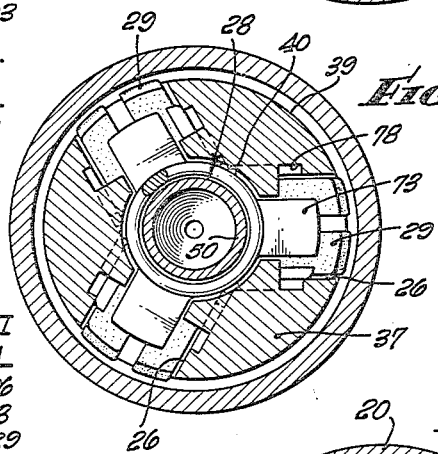
Fig. 3 is a transverse sectional view taken in the plane indicated by line III—III of Fig. 1.
Figure 4:
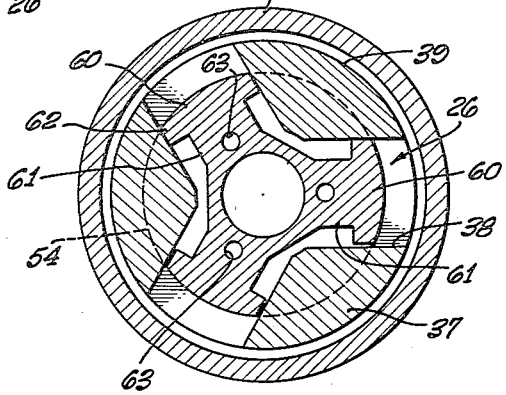
Fig. 4 is a transverse sectional view taken in the plane indicated by line IV—IV of Fig. 1.
Figure 11:
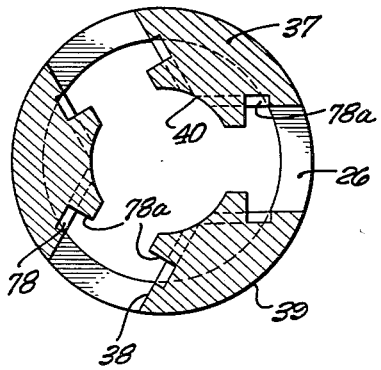
Fig. 11 is a transverse sectional view taken in the plane indicated by line IX—IX of Fig. 10.

In Fig. 1 there is shown a portion of a well casing having a cylindrical casing wall 20. Within the casing wall 20 is a rotatable drilling string 21 to which is connected a cutting device or casing mill of this invention generally indicated at 22. Generally speaking, the casing mill 22 includes a casing mill body member 24 provided with a bottom piston chamber 25 and above said chamber with a plurality of (in this example, three), longitudinally extending circumferentially spaced openings 26. A piston means 28 is movable longitudinally within the casing body member and may carry a plurality of cutter members 29 disposed within said openings 26, said cutter members being movable longitudinally and laterally outwardly through said openings. A flush valve means 30 carried within piston means 28 is cooperable with a ported shoe 44 at one end of said piston chamber 25, said valve means being operable to direct drilling fluid into piston chamber 25 below the piston head of the piston means 28. In extended position, cutter members 29 engage depending pressure transmitting fingers 31 carried by the casing mill body member above and extending into openings 26 so as to transmit pressure forces directly from the drilling string 21 to the cutter members 29.

Figure 10:
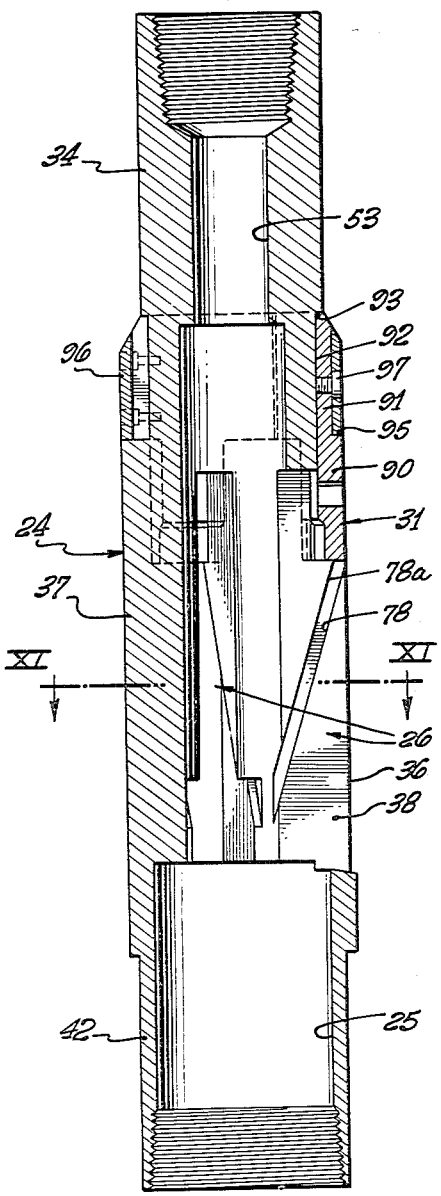
Fig. 10 is a sectional view of a casing mill body member employed with the mill of Fig. 1, the section being taken in the same planes as Fig. 1.
Figure 12:
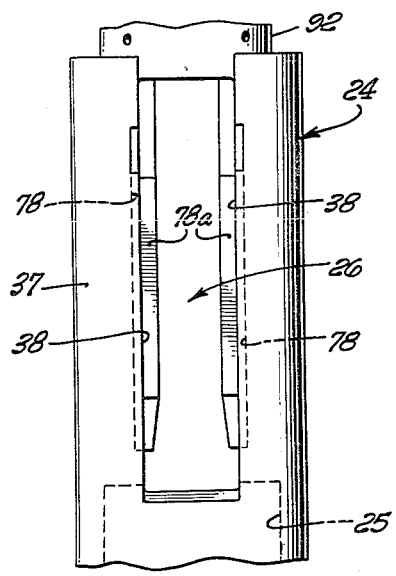
Fig. 12 is a fragmentary elevational view of the body member of Fig. 10.

The hollow casing mill body member 24 is best seen in Figs. 1, 10, and may be integrally formed of suitable metal stock. Top portion 34 of body member 24 may be provided with internal threads for connection to one end of a drilling string member as at 35. An intermediate portion 36 of body member 24 may comprise relatively thick, circumferentially spaced longitudinally extending wall sections 37 having vertically extending wall surfaces 38 lying parallel to radii of the body member disposed at 120° to each other. Juxtaposed wall surfaces 38 of adjacent wall sections 37 define therebetween the longitudinally extending openings 26. Each wall section 37 may be provided with an outer curved external surface 39 and an internal curved surface 40. Below intermediate portion 36, body member 24 is provided with the piston chamber 25, said chamber being defined by a cylindrical wall 42 extending from the bottom of openings 26.

A suitable shoe 44 may be provided threaded engagement at 45 with internal threads provided on the bottom portion of the cylindrical wall 42 of the body member 24. Shoe 44 is provided with an axial throughbore 46 and at the upper end of throughbore 46, the shoe may be provided with a tapered or conical valve seat 47. Shoe 44 thus provides a ported bottom wall for the piston chamber 25. Shoe 44 may be provided with external cutting elements 48.

The piston means 28 may comprise an elongated hollow piston stem 50 provided at its top with annular seal means 51 for sealing slidable engagement with passageway 53 provided in the top portion 34 of body member 24. The opposite bottom end of piston means 28 includes a cylindrical piston head 54 provided with downwardly facing circumferential recess 55 adapted to receive annular packing means 56 which may be retained in said recess by an annular piston flange 57 secured to the bottom face of the piston head as by stud bolts 58. The piston head 54 with annular packing means 56 is adapted to sealably slidably engage the internal cylindrical walls of piston chamber 25.

Above piston head 54 the piston means may be provided with longitudinally upwardly extending circumferentially spaced (at 120°) piston wall sections 60 adapted to be aligned with and slidably received in openings 26 between wall surfaces 38 of the body member 24. Each piston wall section 60 may be of generally T-section having a relatively thick stem portion 61 and an arcuate outer cross head portion 62, said portion 62 being spaced inwardly of the outer surface 39 on the body member 24. A longitudinal passageway 63 extends through each thick stem portion 61 and piston head 54 so as to provide restricted communication between the piston chamber 25, and the opening 26. It will be noted that piston wall sections 61 provide an interlocking engagement with the wall sections 37 of the body member so that the body member and the piston means rotate together when torque is transmitted thereto by the drilling string.

The axial passageway provided by the hollow stem 50 of the piston means 28 terminates at piston head 54 in a valve chamber 65 in which may be disposed valve means 30 comprising a hollow valve member 66 provided with an axially ported valve head 67 at the bottom end thereof, said head 67 having a tapered or conical outer face 68 adapted to seat on valve seat 47. The valve head 67 may be integral with an upwardly extending hollow skirt 69 open at its top and provided with a plurality of circumferentially and longitudinally spaced openings or ports 70. Ports 70 provide communication between piston chamber 25 below the piston head and the axial passageway in the hollow piston stem 50. It will be noted that piston stem 50 is provided communication with the passageway 53 in the top portion 34 of the body member and with the axial bore which extends through drilling string 21 for conducting and circulating drilling fluid.

Cutter members 29 are carried by the piston means 28 above the piston wall sections 60 and for that purpose each may be provided with a seat on the top face 72 of each wall section 60. Cutter members 29 are retained against longitudinal movement relative to the piston means by a plurality of circumferentially spaced radially outwardly extending cutter member retaining lugs 73, said lugs 73 being aligned with and spaced from top faces 72 of wall sections 60 so as to closely receive members 29 therebetween.

The piston means 28 may be biased downwardly by a coil spring 74 which encircles piston stem 50. Spring 74 may be seated at one end on upwardly directed surfaces 75 provided by lugs 73 and at its other end on annular shoulder 76 provided in hollow body member 24.

Guide and inclined pressure transmitting means are provided on body member 24 and on each cutter member 29 to positively urge the cutter members 29 in openings 26 radially outwardly upon relative movement of the piston means upwardly with respect to body member 24. On the intermediate portion 36 of the body member 24 and in each wall surface 38 may be provided a guide groove 78 which extends diagonally upwardly from adjacent the bottom of an opening 26 at a point spaced from the axis of the body member to the top of opening 26 adjacent the external surface of the body member. The guide grooves 78 on opposite wall surfaces 38 in each opening 26 are aligned and include spaced inclined groove wedge faces 78a lying in a plane converging downwardly toward axis of the body member.

Each cutter member 29 includes a base portion 80 provided on opposite sides with inclined or diagonally arranged guide ribs or elements 81 adapted to slide in the grooves 78. Thus each cutter member 29 received in opening 26 is adapted upon upwardly relative movement of the piston means 28 to be positively urged laterally outwardly toward the casing wall.

The base portion 80 of the cutter member 29 may comprise a concave inner face 82 concentric with the cylindrical surface of the piston stem between lugs 73 and top face 72 of the piston wall sections 60. A curved outer face 83 of base portion 80 may also be concentric to inner face 82. Outer face 83 may be provided with a pair of laterally spaced longitudinally extending outwardly projecting reinforcing or back-up flanges 85 and 84, each flange 84 and 85 providing reinforcement for a cutting segment 86 of cutter member 29. Flange 84 may be formed centrally of the base portion and flange 85 may extend from a margin of face 83 whereby cutting segments 86 may be arranged in parallel spaced relation, each bonded to and supported by face 83 and the contiguous face 87 of the flange. The cutting segments may be of generally rectangular section and extend the length of base portion 80.

The cutting segments 86 may be formed from a matrix of silver and tungsten carbide particles. The soft silver matrix is adapted to wear and wash away to permit the hard cutting carbide particles engage with a casing wall being cut to successively serve their cutting function and then break off and be washed away. Thus cutting segment is effective for the length or height of the cutting segment secured to the base portion 80.

In the cutter member 29 illustrated in Figs. 7 and 8, the cutting segments 86 are provided with a bottom outwardly directed cutting lip 88 designed to facilitate making an initial cut into the internal cylindrical surface of a casing wall. For this purpose each cutting segment 86 provides cutting edges at 88a and 88b. When the cutting lip 88 has penetrated the casing wall, cutting edges 86a and 86b engage the casing wall. When a window the length of the cutter member is completed in the casing wall, then cutting edges 86b are effective in a downward direction and continue to cut until the segment 86 is worn away. A longitudinal portion of back up flanges 84 and 85 may be worn away during cutting when cutter member is in extended position.

The cutting member 29 shown in Fig. 9 includes similar construction as that shown in Fig. 7 but cutting segment 86' is not provided with the outwardly directed lip 88. The cutting member 29' is used after a window opening has been made through a casing wall. The pair of cutting segments 86' provided spaced cutting edges 86'b to engage the upwardly facing cut edge of the casing wall.

Means to limit upward movement of the cutter members 29 and also to provide positive direct transmittal of downwardly applied pressure forces to cutter members 29 and 29' after an opening has been made in the casing wall may comprise depending circumferentially spaced pressure fingers 31 which extend into the top portions of openings 26. Each finger 31 includes a bottom arcuate relatively thick section 90 integrally formed with a reduced section arcuate wall 91 which may seat against the top portion 34 of the body member 24 as at 92 and against a downwardly facing shoulder 93 provided thereon. Three of such pressure fingers are provided one for each cutter member 29, and form a split collar which encircles the top portion 34. Each of the arcuate walls 91 may be secured to top portion 34 by a pair of stud bolts 94. The thick section 90 defines with the arcuate wall 91 an upwardly facing external shoulder 95 which may provide a seat for a retaining sleeve 96, said sleeve 96 being secured as by bolts 97.

It will be noted that passageway means are provided for drilling fluid through the drilling string 21 through the passageway section 53 of the body member 24 through the piston stem 50 and through the ported head of the valve 68 into the ported shoe 44.

Operation of the casing mill will be readily understood from Figs. 1, 5 and 6. In Fig. 1 the downwardly biased piston means 28 in the casing body member 24 is in lowermost position in which cutter members 29 are seated on the wall sections 60 of the piston means and are in retracted position. The bottom face of the piston head is in close proximity to the top face of shoe 44 and flush valve means 69 is seated on the valve seat 47 so as to substantially close the through-bore 46 of the shoe 44.

Introduction of drilling fluid into the pipe string 21 produces a fluid pressure against valve means 69 so as to firmly seat valve head 67 on valve seat 47. Since only limited drilling fluid passes through the ported valve head, a fluid pressure is created which causes drilling fluid to escape through bottom-most openings 70 in the skirt of the valve member and into space between the bottom of the piston head and the top face of shoe 44. At the same time drilling string 21 is rotated which produces rotation of the interlocked body member 24 and piston means 28 within the casing. As fluid pressure of the drilling fluid increases and develops in piston chamber 25, the piston means 28 is pressed upwardly relative to the body member 24. In such upward movement of the piston means the cutter members 29 carried thereby are caused to be urged radially outwardly by cooperable guide groove and guide rib engagement of each cutter member with the casing body member 24. As the cutter members 29 are rotated and urged toward the casing wall, the outer cutting lips or projections 88 of each cutter member contact the internal surface of the casing wall and commence to form a cut therein. The pressure forces applied to the cutter members at this initial phase of operation are those developed by the drilling fluid in the piston chamber to raise the piston means.

As soon as a cut is formed in the casing wall so that the cutting members engage metal along bottom cutting edges 88b on the cutting segments 86, downward pressure applied to the body member through the drilling string causes cutter members 29 to be squeezed or wedged between the cut edge of the casing wall and the inclined pressure faces 78a in grooves 78 formed in the body member 24. The cutter members are positively urged and forced radially outwardly under pressure toward and through the casing wall. Thus as downward pressure is applied to the drilling string the rotating cutter members 29 are self-fed or self-energized into such outward cutting engagement with the casing wall because of the wedge relation thereof with the body member and the casing wall. Also assisting this outward movement of cutter members 29 is the pressure drilling fluid in the piston chamber. The drilling fluid is afforded limited circulation through passageways 63 into, behind, and around the cutter members 29 to wash away cuttings made by the cutting operation.

As the casing wall continues to be cut, the piston head moves upwardly relative to the piston chamber and the cutter members are laterally radially urged outwardly as above described and as best shown in Fig. 5. At a predetermined point in the upward path of movement of the piston which substantially coincides with or occurs just after penetration of the casing wall by the cutter members, the piston flange 57 at lip 57a engages shoulder 69a on the skirt of the valve member and lifts the valve member from its seat at 47. As the valve is fully opened an immediate drop in pressure of drilling fluid occurs. This pressure drop is recordable at the surface by well known means and inform the operator that the cutter members have penetrated the casing. The piston head continues to move upwardly relative to the body mmeber 24 until the cutter members reach extended position as shown in Fig. 6, the valve member being carried upwardly by the piston head.

In Fig. 6 the casing wall has been cut through with the cutting members in extended position, the cutting segments 86 overlying the top cut edge of the casing wall. It will be noted that the rigid, solid base portion 80 of each cutting member 29 is now positioned in contact with the bottom face of the pressure fingers carried by the body member and is no longer seated on the top face of piston wall sections 60. Thus as the drilling string is further rotated and downward pressure is applied to the drilling string such downward pressure is transmitted directly through the drilling string to the top portion 34 of the casing mill body member, to the arcuate pressure fingers 31, through the base portions 80 of the cutting members, and to the top cut edge of the casing wall. Thus direct pressure may be applied to the cutting member to cut an opening or window of selected length in the wall of the casing member.

Under such cutting conditions it will be readily apparent that each cutter member 29 provides a plurality of spaced cutting edges 88a, 88b, 86a, and 86b. Initially the outer projection 88 provides a cutting edge at 88a to engage the internal surface of the casing mill. As a cut is made in the casing wall as shown in Fig. 5, lower horizontal cutting edges 88b provided on the projection cut the bottom edge of the cut portion of the casing wall. After the cutting member has penetrated, the casing wall then there are provided the two leading cutting edges 86a of the cutting segments 86 of each cutting member. As cutting continues the tungsten carbide particles are dislodged from the soft silver matrix and are flushed or washed away by the drilling fluid, and other tungsten carbide particles are exposed to cut the casing. It will be noted that the longitudinally extending central slot 84 provided in each cutter member permits flushing away of cuttings made by the cutting edges.

After the casing wall has been penetrated and the cutting member 29 positioned in the cut opening as shown in Fig. 6, it may be desirable to substitute for cutter member 29 the cutter member 29'. In cutting of a window or elongated opening the casing wall, the cutter member 29' provides parallel spaced cutting segments 86' which will engage the top cut edge of the casing wall and continue to cut said edge until a longitudinal section of the cutting segment has been completely cut or worn away.

In such engagement a cutting groove 100 may be formed in the cutting segment along phantom lines indicated in Fig. 9.

It will thus be readily apparent to those skilled in the art that each cutting member 29 may be simultaneously uniformly positively urged radially outwardly by downward pressure applied to the drilling string, and after a window opening has been provided there is direct pressure transmission through the device and through the cutting member to the wall casing being cut. The advantage of such a positive direct transmission of pressure forces for cutting purposes provides fast cutting of the casing wall.

It is believed that assembly of the casing mill will be readily understood from the description of the drawings. The cutting members 29 are engaged with the guide grooves 78 in the casing mill body member before the split collar of fingers 30 is secured to the body member. Each cutting member 29 is thus carried by and interlocked with the piston means 28 and is capable of radial outward or lateral movement relative thereto. In uppermost position each cutting member 29 is not seated on the wall sections 60 of the piston head means although the top lugs 73 on the piston means may still engage, through action of downward biasing spring 74, the top inner edge margin of the cutter member.

It is understood that various changes and modifications may be made in the cutting device or casing mill described above and all such changes and modifications coming within the scope of the appended claims are embraced thereby.

We claim:

1. In a self-energizing rotary casing mill for internally cutting through a casing wall, the combination of: a hollow body member provided with a connection to a drilling string and with a hollow piston chamber, a ported shoe having a valve seat and carried by said body member at one end of said piston chamber, said body member being provided with a longitudinal opening and inclined guide means at walls defining said opening; a downwardly biased piston means operable in the body member and having a piston head in the piston chamber and provided with a through passageway in communication with the drilling string; a ported valve means in the piston head cooperable with the valve seat on the shoe; and a cutter member carried by the piston means and having guide means cooperably engaged with the guide means on said body member, said cutter member being movable longitudinally and radially outwardly in said longitudinal opening along a path defined by said cooperable guide means in response to pressure fluid introduced into said piston chamber.

2. A casing mill as stated in claim 1 including pressure transmitting means carried by the body member and extending into said opening for cooperation with said cutter member in extended position thereof.

3. A casing mill as stated in claim 1 wherein said guide means on said body member include pressure transmitting wedge faces to urge said cutter member radially outwardly.

4. A casing mill as stated in claim 1 wherein said cutter member is carried by said piston means between longitudinally spaced means at said opening.

5. A casing mill as stated in claim 4 wherein one of said spaced means is disengaged with said cutter member in extended position of the cutter member.

6. A self-feeding rotary cutting device for internally cutting through a pipe wall, comprising in combination: a hollow body member adapted to be supported for rotation in a pipe, said body member being provided with a piston chamber and a longitudinally extending opening; a piston means movable within the body member and having a piston head in said chamber and longitudinally spaced means opposite said opening and movable longitudinally thereof; a cutter member longitudinally retained between said spaced means on the piston means and movable radially outwardly in said opening to extend therebeyond; guide means on said body member cooperable with guide means on said cutter member to guide said radial outward movement of the cutter member; and valved passageway means in communication with said piston chamber to introduce pressure fluid to said piston chamber whereby relative movement of the piston means with respect to the body member will urge said cutter member outwardly through said opening.

7. A device as stated in claim 6 wherein said guide means on said body member include inclined pressure faces and said guide means on the cutter member includes correspondingly inclined faces slidable on said pressure faces whereby longitudinally directed pressure forces applied through said body member urges said cutter member outwardly after an initial cut is made in said pipe wall.

8. A device as stated in claim 6 wherein one of said longitudinal spaced means on the piston means includes a longitudinally extending piston wall section slidable in said opening and having a seat for said cutter member.

9. A self-feeding rotary cutting device for internally cutting through a pipe wall, comprising in combination: a hollow body member adapted to be supported for rotation in a pipe, said body member being provided with a piston chamber and a longitudinally extending opening; pressure transmitting means carried by said body member and extending into said opening; a piston means movable within the body member and having a piston head in said chamber and longitudinally spaced means at said opening and movable longitudinally thereof; a cutter member longitudinally retained between said spaced means on the piston means and movable radially outwardly in said opening to extend therebeyond; guide means on said body member cooperable with guide means on said cutter member to guide said radial outward movement of the cutter member; and valved passageway means in communication with said piston chamber to introduce pressure fluid to said piston chamber whereby relative movement of the piston means with respect to the body member will urge said cutter member outwardly through said opening, said cutter member in extended position having pressure contact with said pressure transmitting means.

10. In a self-feeding casing mill for internally cutting through a pipe casing, the combination of: a hollow body member provided with a plurality of circumferentially spaced longitudinal openings and with a piston chamber at one end of said body member; pressure transmitting means carried by the body member at one end of each longitudinal opening; a ported shoe closing one end of said piston chamber and provided with a valve seat; a piston means coaxially disposed in said body member and having a piston head operable in said piston chamber; a valve means cooperable with said valve seat and movable in said piston head; spring means biasing said piston means toward said one end of said member; cutter means carried by the piston means and laterally and longitudinally movable in said longitudinal openings; and means on the body member and means on said cutter means to urge said cutter means radially outwardly along a predetermined path upon introduction of fluid pressure to said piston chamber and upon pressure transmitted downwardly through said body member, said cutter means in extended position having pressure contact with said pressure transmitting means.

11. A cutter member for a casing mill comprising: a base portion provided with radially outwardly extending laterally spaced, parallel reinforcing flanges; spaced cutting segments supported and secured on contiguous faces of said base portion and each flange, said cutting segments being formed of a matrix of silver and tungsten carbide particles, and diagonally arranged guide ribs on sides of said base portion.

12. A cutter member for use with a casing mill including a base portion, a pair of longitudinally disposed spaced cutting segments provided on one face of said base portion, a pair of spaced reinforcing flanges on said base portion to support said cutting segments, and diagonally arranged guide means provided on sides of said base portion.

13. A cutter member as stated in claim 12 wherein each cutting segment includes a radially outwardly projecting bottom lip.

14. A piston means for use with a casing mill as described including a hollow piston stem and a piston head, circumferentially spaced longitudinally extending piston wall segments extending above said head, a plurality of lugs on the piston stem spaced from and aligned with said piston wall sections, each lug and wall section providing an opening for securing and positioning a cutter member.

15. A body member for use with a casing mill comprising: a top portion adapted to be connected to a drilling string; an intermediate portion provided with circumferentially spaced longitudinally extending openings; a bottom portion providing a piston chamber; and diagonally arranged guide means on walls forming the longitudinally extending openings and defining pathways for cutter members.

16. In combination with a casing mill including a casing mill body provided with guide means, and means to rotate the casing mill body member, the provision of: a piston means including a piston stem provided with a plurality of lugs and aligned piston wall sections spaced from said lugs; and a cutter member positioned between each aligned lug and wall section and adapted to move laterally with respect to said piston stem, said cutter member including a base portion provided with guide means at sides thereof cooperable with guide means on said casing mill body member for guiding lateral movement of the cutter member with respect to said piston stem.

17. In a self-feeding casing mill for internally cutting through a pipe casing, the combination of: a hollow body member provided with a plurality of circumferentially spaced longitudinal openings and with a piston chamber at one end; a ported shoe closing one end of said piston chamber and provided with a valve seat; a piston means coaxially disposed in said body member and having a piston head operable in said piston chamber; a valve means cooperable with said valve seat and movable in said piston head; spring means biasing said piston means toward said one end of the body member; cutter means carried by the piston means and laterally and longitudinally movable in said longitudinal openings; and inclined means on the body member and means on said cutter means to urge said cutter means radially outwardly along a predetermined path upon introduction of fluid pressure to said piston chamber and upon pressure transmitted downwardly through said body member, said cutter means including a plurality of cutter members in circumferentially spaced relation.

References Cited in the file of this patent
UNITED STATES PATENTS

| | | |
|---|---|---|
| 1,772,710 | Denney | Aug. 12, 1930 |
| 1,773,389 | Church | Aug. 19, 1930 |
| 2,183,922 | Robbins | Dec. 19, 1939 |
| 2,215,638 | Ellis | Sept. 24, 1940 |
| 2,228,498 | Young | Jan. 14, 1941 |
| 2,344,955 | Aber | Mar. 28, 1944 |
| 2,460,948 | Sander | Feb. 8, 1949 |
| 2,690,897 | Clark | Oct. 5, 1954 |
| 2,785,025 | Wilson | Mar. 12, 1957 |